United States Patent [19]

Miller

[11] Patent Number: 4,865,493

[45] Date of Patent: Sep. 12, 1989

[54] APPARATUS AND METHOD FOR OPENING COMBINATION SAFES

[75] Inventor: J. Clayton Miller, Nicholasville, Ky.

[73] Assignee: Lockmasters, Inc., Nicholasville, Ky.

[21] Appl. No.: 142,839

[22] Filed: Jan. 11, 1988

[51] Int. Cl.[4] .............................................. B23B 35/00
[52] U.S. Cl. ..................................... 408/1 R; 70/465; 408/111
[58] Field of Search ............... 408/1 R, 84, 99, 103, 408/111, 112, 115 R; 70/465; 29/804

[56] References Cited

U.S. PATENT DOCUMENTS

| | | | |
|---|---|---|---|
| 2,341,969 | 2/1944 | Weisner | 408/72 |
| 2,379,182 | 6/1945 | Porter et al. | 408/241 R |
| 2,645,951 | 7/1953 | Sponsler | 408/103 |
| 3,677,655 | 7/1972 | Ratteree et al. | |
| 3,884,592 | 5/1975 | Shulters | 408/111 |
| 4,242,016 | 12/1980 | Faris | 408/112 |
| 4,307,983 | 12/1981 | Blough et al. | |
| 4,447,176 | 5/1984 | Blough et al. | |
| 4,533,284 | 8/1985 | Agius et al. | |
| 4,662,201 | 5/1987 | Phillips. | |
| 4,714,386 | 12/1987 | Phillips. | |

FOREIGN PATENT DOCUMENTS 144904 10/1903 Fed. Rep. of Germany ...... 408/111

Primary Examiner—Joseph H. McGlynn
Assistant Examiner—Daniel W. Howell
Attorney, Agent, or Firm—King and Schickli

[57] ABSTRACT

An apparatus and method are provided for precisely positioning a locksmith tool in the area of a dial ring of a combination lock of a safe. The apparatus includes a derrick that holds and supports the locksmith tool. An offset, annular base forms a part of the derrick and has an opening with an inner diameter substantailly corresponding to the diameter of the outer periphery of the dial ring. The base is placed over the dial ring and radially extending set screws in the base are tightened into engagement with the dial ring. In this manner, the derrick is securely attached to the safe. The apparatus also includes a mechanism for precisely controlling and adjustably positioning the tool relative to the safe. The method includes the steps of (1) identifying the type and model of lock on the safe; (2) selecting a dial ring attaching means corresponding to the lock; (3) connecting the selected dial ring attaching means to the mounting means; and (4) attaching said mounting means to the safe door by securing the dial ring attaching means to the dial ring.

2 Claims, 2 Drawing Sheets

U.S. Patent   Sep. 12, 1989   Sheet 1 of 2   4,865,493
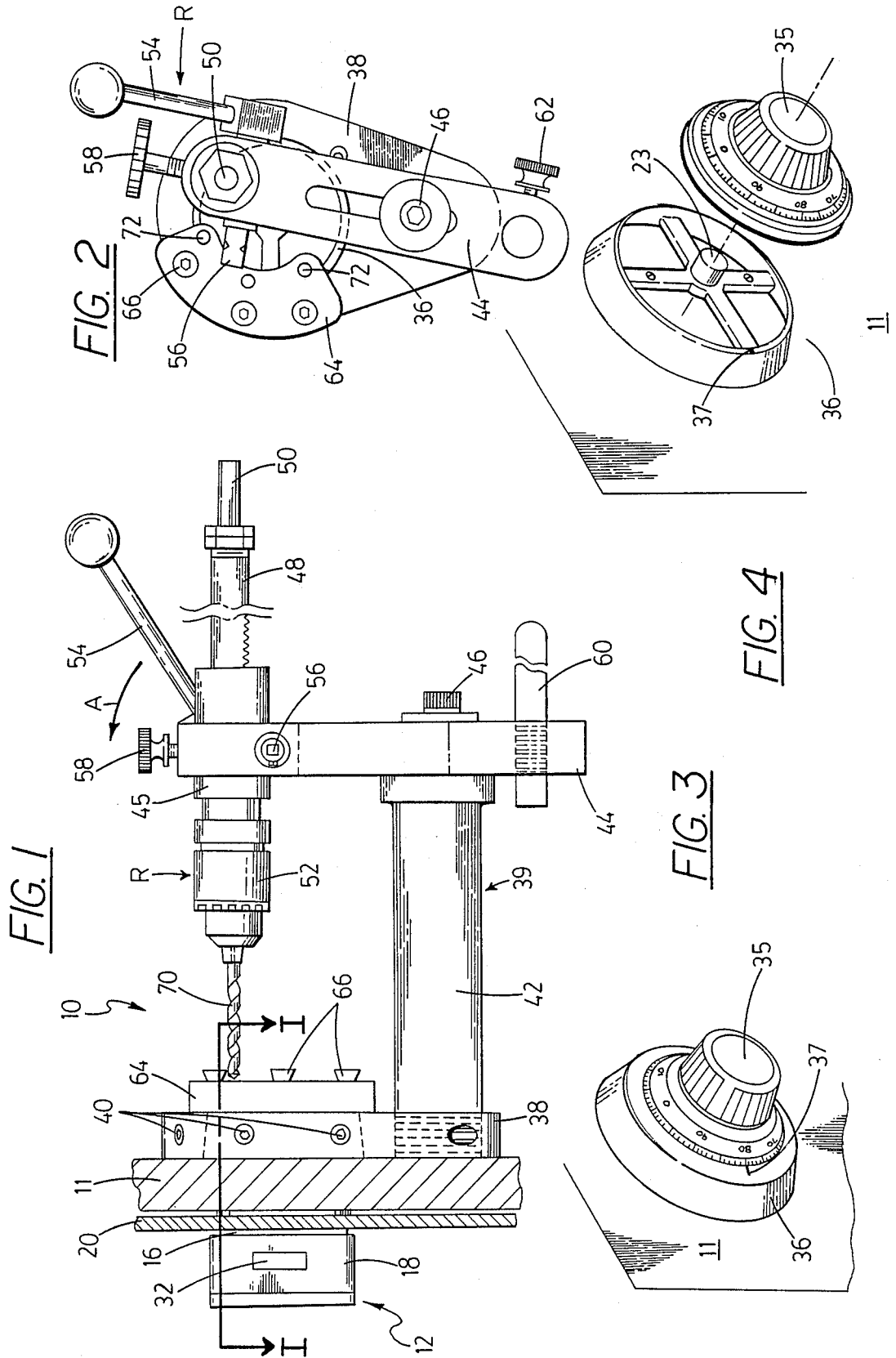

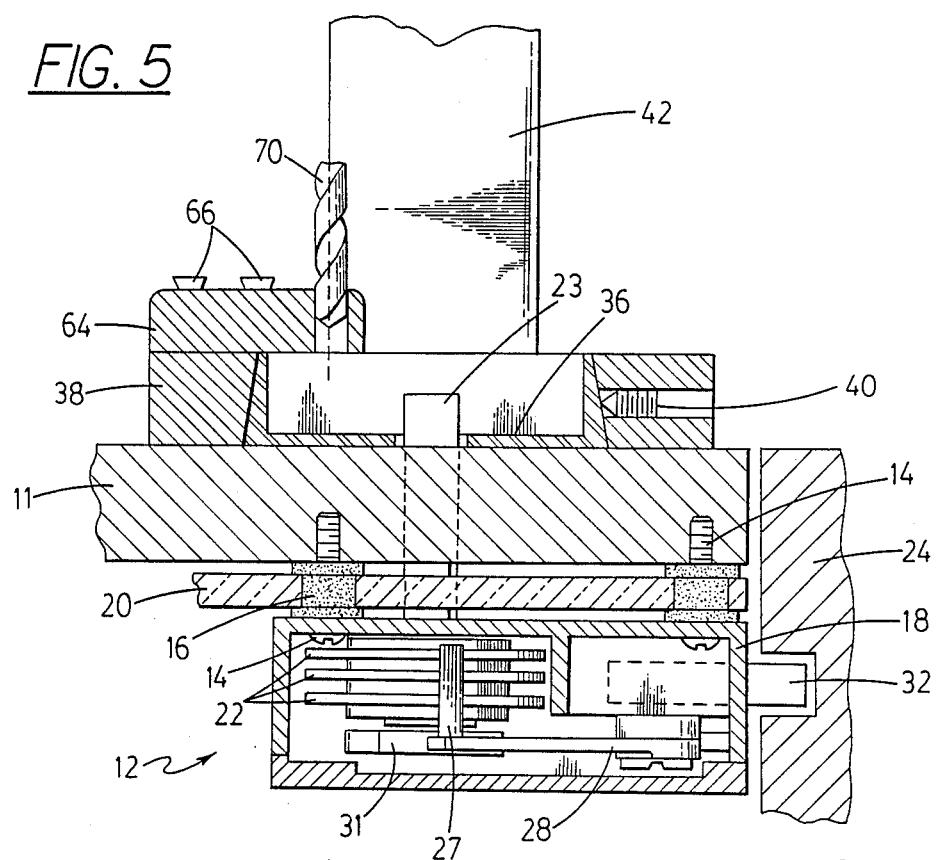
FIG. 5
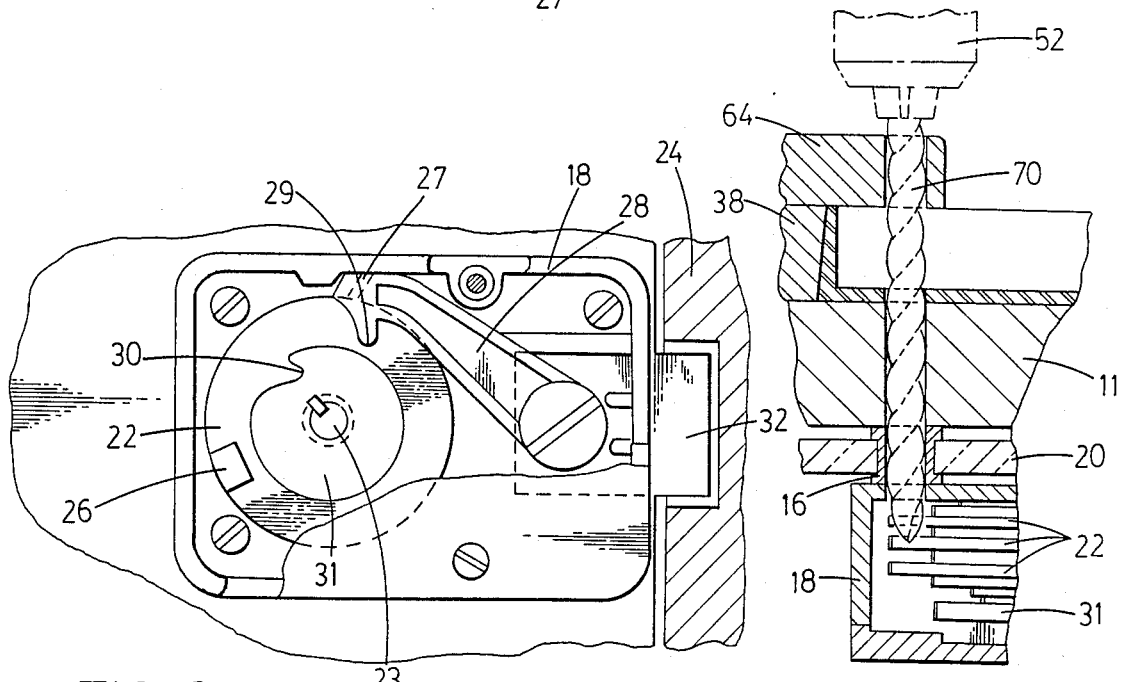
FIG. 6
FIG. 7

APPARATUS AND METHOD FOR OPENING COMBINATION SAFES

TECHNICAL FIELD

The present invention relates generally to locksmith's tools and methods and, more particularly, to an apparatus and method for precisely positioning a locksmith tool in the area of a dial ring of a combination lock of a safe. For example, the present invention may be utilized to position a drill for the accurate drilling of an inspection hole to allow the opening of a safe, where the combination is unavailable, without permanently damaging the lock or the safe.

BACKGROUND OF THE INVENTION

Over recent years there has been a substantial increase in the number of thefts and burglaries. As a consequence, more and more businesses and individuals are purchasing safes with a combination lock for securely storing their valuables.

In order to provide the best possible security, these safes are constructed of strong, heavy gauge metal. They also include carefully machined tumblers to provide smooth and silent lock operation. Because of the craftsmanship and material costs involved in safe construction, a good safe represents a very significant capital investment.

One problem with combination lock safes is that they are only useful so long as the lock is functioning properly and/or the combination is known. If, for example, a malfunction develops in the lock mechanism or the combination is forgotten or the only person who knows the combination disappears or dies, the valuables within the safe cannot be removed until the safe can be opened in some manner. The safe could be opened by forced entry. Ideally, however, because of the significant investment a safe represents, the safe is opened by manipulation without damaging the valuables inside or even the safe lock so that the safe may be reused once the combination is again determined.

Conventional combination locks include a plurality of tumbler wheels mounted coaxially on a spindle and coupled in a unique fashion representing the combination. The spindle projects through to the outside of the safe door. A calibrated dial is attached to the end of this spindle. The coupling of tumbler wheels to the spindle includes lost motion connections that ensure the tumbler wheels may only be rotated and aligned when the dial is manipulated in the correct sequence and direction. The dial is mounted within a dial ring which typically has a reference mark scribed thereon. This mark provides a reference for the dial calibrations. In other words, the lock's combination is dialed relative to this reference mark.

A sliding bolt is contained within the safe door. This bolt is extended into the jam of the safe body to lock the safe. A fence lever is pivotally connected to the sliding bolt. In operation, when the tumbler wheels are positioned according to the combination, recessed gates in the wheels line up. The fence lever then engages these gates, allowing a nose of the fence lever to engage a spindle drive cam. Once this engagement occurs, the bolt can be withdrawn, allowing the safe door to be opened.

U.S. Pat. No. 4,662,201 issued to Peter J. Phillips, May 5, 1987, and assigned to the present assignee discloses a method for ascertaining the combination of a locked safe. This method includes drilling an inspection hole at a known position with respect to the dial through the safe door and into the underlying lock chamber. A specially tipped probe is then inserted into the lock and manipulated along with the tumbler wheels in such a fashion that the tumbler wheel gates can be found. From the position of these gates, the lock combination can be computed.

Similarly, U.S. Divisional patent application, Phillips, Ser. No. 004,155, now U.S. Pat. No. 4,714,386, issued Dec. 22, 1987 and assigned to the present assignee discloses an apparatus for carrying out the above method. Use of this apparatus requires removal of the safe dial and dial ring. A mounting fixture is then mounted to the safe door, in place of the dial ring. A derrick is then attached to this fixture to hold the drilling position and thereby facilitate drilling into the safe door. Use of this apparatus is limited to situations where both the dial and dial ring can be removed from the face of the safe door. In the event the dial or dial ring cannot be removed, this apparatus cannot be used. The removal of the ring is also time consuming and the separate fixture adds additional cost to the kit for carrying out the method.

A need therefore exists for an improved apparatus provided to hold a drill precisely in position for the drilling of an accurate inspection hole. The apparatus must be capable of mounting directly to a safe dial ring, negating the necessity for removal of same and eliminating the use of a separate mounting fixture. Use of such an apparatus, and related method would better assist locksmiths in opening most commercially available safes, including, of course, those in which the dial and/or dial ring cannot be removed.

Thus, this invention in its broader terms is directed to holding and supporting a locksmith tool on the door of a safe. More specifically, the tool's position may be precisely controlled so as, for example, to allow accurate locating, and then drilling of an inspection hole. The locksmith may then pass the fiberoptic element of a borescope through the inspection hole into the lock chamber. The borescope allows visual inspection of the lock tumblers including the gates, and thereby allows accurate determination of the safe combination.

The apparatus and method should also be useful to mount and firmly support an automatic dialer or other similar non-invasive device. Supported in this fashion, the dial may be automatically rotated back and forth until the combination is determined and the safe is opened.

Advantageously, the proposed use of this apparatus with either device allows the locksmith to open a safe without destroying the safe or its contents.

SUMMARY OF THE INVENTION

Accordingly, it is a primary object of the present invention to provide an apparatus and method for mounting and supporting a locksmith tool, such as may be used in opening a combination lock of a safe and overcoming the limitations and disadvantages of the prior art.

Another object of the present invention is to provide an apparatus and method that is convenient to use and particularly effective in efficiently and reliably holding a locksmith tool for opening the lock of a safe, for which the combination is unavailable, in order to gain access to the safe contents without significantly damaging the safe.

It is another object of the present invention to provide an apparatus and method for precisely positioning a drill rig used to safely and accurately drill a lock inspection hole in the door of a safe which is inoperative so as to allow subsequent, easy opening of the safe without significantly damaging the contents of the safe or the lock mechanism.

It is still another object of the present invention to provide an apparatus readily mounted to the dial ring of a number of different makes and models of safes and then used to precisely hold and support a drill in position for accurately drilling a reparable lock inspection hole through the safe door.

Another object of the present invention is to provide a method for drilling an inspection hole utilizing the dial ring as support for a locksmith tool, such as a drill rig.

Additional uses, objects, advantages, and other novel features of the invention will be set forth in part in the description that follows and in part will become apparent to those skilled in the art upon examination of the following or may be learned with the practice of the invention. The apparatus is, for example, specifically disclosed for use to precisely position an automatic dialer over the dial with the dial actuator in engagement with the safe dial so that the safe opening operation may be carried out. The objects and advantages of the invention may be realized and attained by means of the instrumentalities and combinations particularly pointed out in the appended claims.

To achieve the foregoing and other objects, and in accordance with the purposes of the present invention as described herein, an apparatus is provided to allow the locksmith to position a tool, such as a drill or automatic combination dialer, over a dial ring of a combination lock of a safe. The preferred embodiment of the invention includes a derrick that mounts and holds the locksmith tool in an operative position spaced outwardly from the face of the door. A means, such as an offset, annular base, attaches the derrick to the dial ring in an advantageous manner. That is, the base is specially designed so as to allow secure attachment directly to the dial ring of the safe.

In order to accomplish this desired result, the opening in the base has an inner diameter substantially corresponding to the diameter of the outer periphery of the dial ring. The base is clamped to the dial ring by fasteners such as set screws. As illustrated, the set screws are provided extending radially through the base. Preferably, the set screws engage the base around substantially the full periphery to insure a firm grip on the dial ring. When tightened, these fasteners thus securely engage the dial ring to hold the base, and in turn the derrick firmly in position. Advantageously, by attaching to the dial ring, the present apparatus eliminates the requirement to remove the dial ring and use an extra component; that is mounting fixtures. Thus, the present apparatus is easier and more economical to use, as well as being adapted for use on those combination safes where the dial and/or dial ring cannot be removed.

In addition, a mechanism is provided on the derrick to allow the position of the tool to be precisely adjusted relative to the safe. In this way, the tool may be moved laterally to perform different specific functions. Once properly positioned, accurate and reliable drilling of inspection holes through the safe door into the lock compartment can be performed.

In accordance with a further aspect f the present invention, the derrick is provided with a mechanism allowing the tool to be more efficiently advanced toward the safe door or withdrawn therefrom. Thus, the positioning apparatus of the invention not only securely holds a locksmith tool in an improved manner, but also allows the tool to be precisely moved across the face of, and toward or away from the safe as desired.

In accordance with the method aspect of the present invention, unique steps are provided for accurately and rapidly positioning a locksmith tool in the area of the dial ring of a combination lock safe. The method includes the initial step of identifying the make and model of the safe lock to be opened. Next is selecting a base for the dial ring that corresponds with the lock make and model. More specifically, an annular base is selected having an inner diameter and contour substantially corresponding to the diameter of the outer periphery of the dial ring.

The selected base is connected to the derrick that holds and supports the locksmith tool. Attaching the derrick and base combination to the safe is performed by clamping the base securely to the dial ring. The base is placed over the dial ring so that the opening is concentrically disposed around it. Fasteners on the base are then tightened to provide radial clamping pressure and thus secure holding engagement with the dial ring.

Still other objects of the present invention will become apparent to those skilled in this art from the following description wherein there is shown and described a preferred embodiment of this invention, simply by way of illustration of one of the modes best suited to carry out this invention. As it will be realized, the invention is capable of other different embodiments and its several details are capable of modifications in various, obvious aspects all without departing from the invention. Accordingly, the drawings and descriptions will be regarded as illustrative and not as restrictive.

BRIEF DESCRIPTION OF THE DRAWING

The accompanying drawing incorporated in and forming a part of the specification, illustrates several aspects of the present invention and together, with the description, serves to explain the principles of the invention. In the drawing:

FIG. 1 is a side view of the apparatus of the present invention including a drill rig;

FIG. 2 is a front view of the apparatus of the present invention illustrating the drill rig laterally offset from the operative position for clarity;

FIG. 3 is a perspective view of the combination lock dial and dial ring mounted on the safe door;

FIG. 4 is an exploded view showing the dial removed from the dial ring;

FIG. 5 is a cross-sectional view taken along section lines I—I of FIG. 1;

FIG. 6 is a rear view of the combination lock with a portion of the cover broken away for clarity;

FIG. 7 is a partial enlargement view similar to FIG. 5 but showing the drill rig repositioned over the guide template and the drill bit penetrating into the combination lock housing thereby creating an inspection hole.

Reference will now be made in detail to the present preferred embodiment of the invention, an example of which is illustrated in the accompanying drawing.

DETAILED DESCRIPTION OF THE INVENTION

Reference is now made to FIGS. 1 and 5 showing an apparatus 10 for holding and positioning a locksmith's tool relative to the door 11 of a safe. The preferred embodiment of the apparatus 10 is being described for utilization with a drill rig R for operation by a conventional electric drill (not shown). The drill rig R preferably takes the form of a drill press so that pressure can be conveniently applied for drilling an inspection hole through the safe door 11 into the lock chamber without damaging the lock. It should be recognized, however, that other locksmith tools may be held in and utilized with the apparatus 10, such as, for example, an automatic dialing device.

As shown in FIG. 5, the safe combination lock 12 is securely mounted to the inside of the safe door 11. Screws 14 pass through the combination lock housing 18 and through mounting bushings 16 into threaded blind holes in the safe door 11. The bushings 16 assist in securely mounting the lock 12 in position. A layer of protective hardplate 20 is provided between the lock 12 and the safe door 11. The screws 14 pass through the hardplate 20 inside the bushings 16.

As best shown in FIGS. 5 and 6, the combination lock 12 includes a number of tumbler wheels 22. Each tumbler wheel 22 is axially connected through a lost motion coupling to a lock spindle 23. As best shown in FIGS. 3, 4 and 5, the spindle 23 extends through the safe door 11 to the outside of the safe where it is received within a calibrated dial 35. The lost motion coupling assures that the tumbler wheels 22 can only be rotated in a predetermined manner when the spindle 23 is rotated by means of the dial 35.

When the lock combination is properly dialed, gates 26 in the tumbler wheels 22 (see FIG. 6) are all brought into alignment. When this occurs, fence 27 on the fence lever 28 drops into the aligned gates 26. This permits the nose 29 of the fence lever 28 to come into engagement with the slot 30 in the lock actuating cam 31. Once the nose 29 and slot 30 are in engagement, further rotation of the spindle 23 by the dial 35 displaces the fence 27. Since the fence 27 is pivotally connected to the locking bolt 32, the bolt is caused to slide until fully withdrawn from the jam of the safe body 24. Once withdrawn in this manner, the safe door 11 may be opened.

A dial ring 36 on the face of the door 11 surrounds the dial 35 (see FIGS. 3 and 4). A reference mark 37 is scribed on the surface of dial ring 36. During customary operation, the dial 35 is manipulated in accordance with the known combination with respect to the reference mark 37 to open the safe.

As mentioned above, the locksmith is frequently called upon to open a safe wherein the combination is either unavailable or unknown. Additionally, it frequently becomes the task of the locksmith to open a safe wherein the combination lock itself is malfunctioning or inoperative. Use of the apparatus of the present invention in combination with a drill and borescope, or automatic dialer, permits the locksmith to accurately, quickly and reliably ascertain the lock's combination.

Thus, in accordance with the preferred embodiment of the present invention, a derrick 39 is provided to securely position and mount a locksmith's tool, such as the drill rig R, directly on the dial ring 36 and over the area of the lock 12. This direct mounting arrangement includes a unique annular base 38 having an offset opening corresponding to the outer periphery of the dial ring 36 (see FIG. 2).

A number of bases 38 are provided to correspond to the various dial rings of different lock models made by various manufacturers. The base 38 that is selected for utilization as a part of the derrick 39 in the preferred embodiment shown, provides an opening not only with an internal diameter that substantially corresponds to the diameter of the outer periphery of the dial ring 36, but also with an axial slope on the inner surface of the opening matching the slope of the outer surface of the dial ring (see FIG. 5). With this arrangement, a substantially tight interface is provided adding to its holding ability.

During use, and as shown in FIGS. 1 and 5, the selected base 38 is securely fastened or clamped to the dial ring 36 by a plurality of threaded fasteners, such as set screws 40. As shown in FIGS. 1 and 5, these threaded fasteners are positioned substantially around the full periphery and extend radially through the base 38 so as to come into direct contact with the dial ring 36. The threaded fasteners 40 are adapted to be tightened with a tool, such as a screw driver or Allen wrench, to provide secure attachment to the safe door 11.

Since the base 38 attaches directly to the dial ring 36, removal of the dial ring is not necessary. Accordingly, use of the apparatus of the present invention allows the locksmith to gain access more quickly and easily than was possible with any prior art devices.

Furthermore, unlike prior art devices, the apparatus of the present invention may be utilized even on those safe models that do not allow removal of the dial and/or dial ring. As will be realized from the detailed description below, when using the apparatus of the invention, the drilling may even be directly through the dial and dial ring if necessary. This is so since the only attachment point necessary is to the outside of the dial ring.

As shown in FIG. 1, the derrick 39 further includes a tower or column member 42 adapted to be threaded into the base 38. The offset design advantageously accommodates a bar of substantial size to form the tower member 42. This concept provides maximum rigidity and assists in relieving stress from the attachment interface at the dial ring 36.

During the drilling operation, the moment arm of the derrick 39 that also includes positioning bar 44 provides a tendency of the apparatus 10 to rotate under the load of applying inward drilling pressure. However, additional holding means, such as chains attached to a chain bracket at the top of the tower member and passing around the safe, are no longer needed under normal conditions. This discovery is contrary to previous understanding in the art. As drilling pressure is applied, the offset portion of the base 38 presses against the safe door 11, thus further relieving the stress from the attachment interface.

The distal end of the tower member 42 contains a threaded mounting hole. The tool positioning bar 44 is mounted at this point and made adjustable upon the end of the tower member by a bolt 46. The positioning bar 44 is substantially parallel to the face of the door 11 and provided to locate and secure drill rig R by clamping the center mounting sleeve 45. Positioning bar 44 can move laterally, both radially and angularly, in a plane generally parallel to the plane of the safe door 11 when the bolt 46 is loosened. An elongated slot permits this freedom of motion. Once the drill rig R is properly positioned, the bolt 46 need only be tightened to thereby securely fasten the tool positioning bar 44 to the tower member 42. In this manner, the operator slides and pivots the bar 44 to move the drill rig R to an inoperative position to allow the initial set up (see FIG. 2), and then quickly moves the rig back and locks it in position for drilling (see FIG. 7).

As shown in FIGS. 1 and 2, the mounting sleeve 45 receives a quill 48 in sliding engagement. A rotatable shaft 50 is retained within the quill 48 and extends beyond the ends of the quill 48. The end of the shaft 50 is adapted for attachment to an electric drill (not shown). At the other end of the shaft 50, a standard drill chuck 52 is mounted to retain drill bit 70.

As shown in FIG. 1, the quill 48 has a rack to engage with a gear (not shown) provided within the positioning bar 44 and passing through an opening in the sleeve 45. A drill press lever 54 is attached to this gear. Actuation of the lever 54 in the direction of action arrow A serves to advance the quill 48, the chuck 52 and the drill bit 70 toward the safe door 11 for drilling. Of course, actuation of the lever 54 in the opposite direction serves to withdraw the same away from the safe door 11 when drilling is completed. For convenience, the drill press lever 54 may be positioned on either side of positioning bar 44 upon feed shaft 56 to allow for both left and right hand operation.

The mounting sleeve 45 is locked in position by a locking thumb screw 58 extending through the end of the positioning bar 44. When tightened, the screw 58 provides positive locking action that holds the entire drill rig R in position. By loosening the screw 58 and removing the shaft 56 and then the drill rig R, another locksmith tool may be positioned and locked in place for use. One example is the automatic manipulation device mentioned above. Each tool would, of course, include a mounting sleeve to match the receiving opening in the end of the positioning bar 44.

As shown in FIGS. 1 and 2, an auxiliary support rod 60 is provided to which the body of the drill (not shown) can be attached. This support rod 60 is slidably retained within an aperture at the end of positioning bar 44 opposite the mounting sleeve receiving end, and is locked into position by means of threaded locking thumb screw 62 (see FIG. 2). This support rod 60 can be removed altogether and replaced by another tool fastening or assisting device that fits in the same mounting aperture, if desired.

According to an important aspect of this invention, the base 38 is adapted to receive a drill guide template 64, comprising two generally planar surfaces and one or more drill guide holes 72 passing normal therethrough. The guide holes 72 have an inner diameter which closely corresponds to the desired diameter of the drill bit 70. These guide holes 72 are located in the template 64 at positions which correspond to the desired inspection hole drilling locations for the particular type of safe lock. The guide template 64 is securely retained upon the drill base 38 via a plurality of screws or other appropriate fasteners 66.

In operation, the locksmith first determines the type and orientation of the lock with which he is dealing; i.e. Mosler, model 001, right-hand mounting and the like. The locksmith next chooses the proper base 38 for engaging the dial ring 36. The base 38 is connected to the tower member 42 to form the derrick 39 by screwing onto the threaded end.

After removing the lock dial 35, the derrick 39 is attached to the safe according to the known orientation of the lock 12 within the safe by clamping the base 38 to the dial ring 36. More specifically, the base 38 is placed over the dial ring 36. The fasteners 40 are then tightened until in secure engagement with the dial ring 36 to thereby firmly hold the derrick 39 in position.

Where an inspection hole is to be drilled, a drill guide template 64 for the particular make and model of lock is selected. The template 64 is then fixed to the base 38, also according to the known orientation of the lock inside the safe. Next, the locksmith selects the drill bit 70, inserts the bit into the chuck 52 and positions the drill rig R so that the bit aligns with the desired drill guide hole 72. More than one guide hole may be provided on each template 64 as shown, so that more than one lock can be accommodated by a single template.

The positioning bar 44 is securely tightened in position and the drill (not shown) clamped in position and its chuck secured to the drive shaft 50. The locksmith is then accurately able to drill through the safe door 11 and into the lock chamber while minimizing the chances of damaging the lock and safe.

In the alternative, if the locksmith so desires, it is not necessary to remove the dial 35. In this case, derrick 39 is mounted on the lock dial ring 36 as before but without removing the dial 35, and the locksmith simply drills through the appropriate guide hole 72, through the lock dial 35, and ultimately through the desired location. This is frequently done when the lock itself is inoperative.

It should be emphasized that use of the apparatus of the present invention allows accurate reliable inspection hole drilling within the area of the dial ring 36. Certain government regulations proscribe drilling a lock outside of the dial ring and use of the apparatus of the present invention does not contravene those standards. As will be apparent, the adjustment of the positioning bar 44 allows this flexibility.

As will now be apparent, the apparatus 10 of the present invention can be efficiently used for positioning a tool in the area of the dial ring 36 on a safe door 11 for use by a locksmith. A derrick 39 attaches directly to the dial ring 36 through the offset, annular base 38 that provides firm support for the tool, such as a drill rig R. The set screws 40 hold the base firmly on the ring 36. Even under the pressure of a drill press operation, the force tending to separate the base 38 from the ring 36 is minimized since the tower member 42 is pressed securely against the face of the safe door 11 due to the moment arm of the positioning bar 44. A drill guide template 64 is mounted on the selected base and provides an easy and accurate way to drill the desired inspection hole at the correct location in the area of the dial ring 36. On certain occasions, such as when the lock is non-operable, the locksmith may elect to drill directly through the dial 35. In any event, substantial time and effort is saved by utilization of the apparatus/method of the present invention, since either the dial ring 36, or the dial 35 and dial ring 36, do not have to be removed.

The foregoing description of a preferred embodiment of the invention has been presented for purposes of illustration and description. It is not intended to be exhaustive or limit the invention to the precise method disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications. All such modifications and variations are within the scope of this invention as determined by the appended claims when interpreted with the breadth to which they are fairly, legally and equitably entitled.

I claim:

1. A method for positioning a locksmith tool in the area of a dial ring of a combination lock on a safe door utilizing a positioning apparatus including a mounting means for supporting said locksmith tool and a means for attaching to said dial ring, comprising the steps of:

identifying the type and model of said lock on said safe;

selecting a dial ring attaching means corresponding to said lock ring;

connecting said selected dial ring attaching means to said mounting means; and attaching said mounting means to said safe door by securing said dial ring attaching means directly upon the surface of said dial ring.

2. The method of claim 1, wherein said attaching step includes the steps of placing said dial ring attaching means over said dial ring, and tightening radial fasteners on said dial ring engaging means until in secure engagement with the outer periphery of said dial ring.

* * * * *